United States Patent [19]

Kuroda et al.

[11] Patent Number: 5,125,267
[45] Date of Patent: Jun. 30, 1992

[54] TROUBLE DIAGNOSIS APPARATUS FOR AN INTERNAL COMBUSTION ENGINE

[75] Inventors: Toshiki Kuroda; Akira Demizu; Akihiro Nakagawa, all of Himeji, Japan

[73] Assignee: Mitsubishi Denki Kabushiki Kaisha, Tokyo, Japan

[21] Appl. No.: 704,511

[22] Filed: May 23, 1991

[30] Foreign Application Priority Data

Jun. 20, 1990 [JP] Japan .................. 2-163226

[51] Int. Cl.$^5$ .................. G01M 15/00
[52] U.S. Cl. .................. 73/115; 73/117.3
[58] Field of Search .................. 73/117.3, 118.1, 115

[56] References Cited

U.S. PATENT DOCUMENTS 4,936,137  6/1990  Iwata et al. .................. 73/115

FOREIGN PATENT DOCUMENTS 53-97120  8/1978  Japan .

Primary Examiner—Jerry W. Myracle
Attorney, Agent, or Firm—Sughrue, Mion, Zinn, Macpeak and Seas

[57] ABSTRACT

A trouble diagnosis appartus comprises a cylinder internal pressure change detecting circuit to detect a change in the inner pressure of the cylinders of an internal combustion engine, a differentiation circuit to effect differentiation of an output signal outputted from the cylinder internal pressure change detecting circuit and a judging circuit to judge the internal combustion engine being faulty when a change quantity of output signal of the differentiation circuit is a predetermined value or lower.

3 Claims, 6 Drawing Sheets

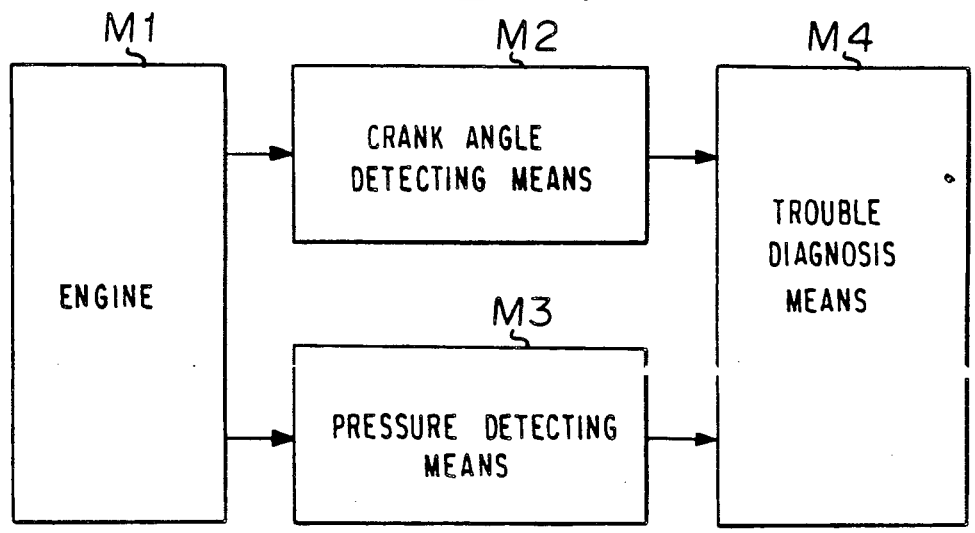
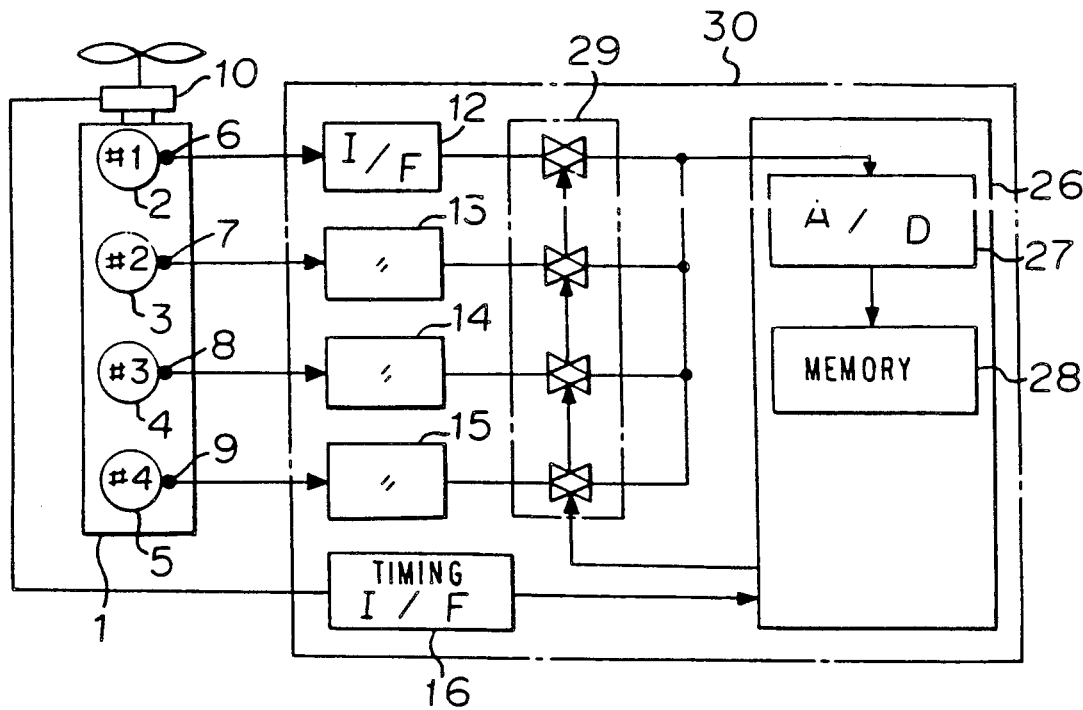

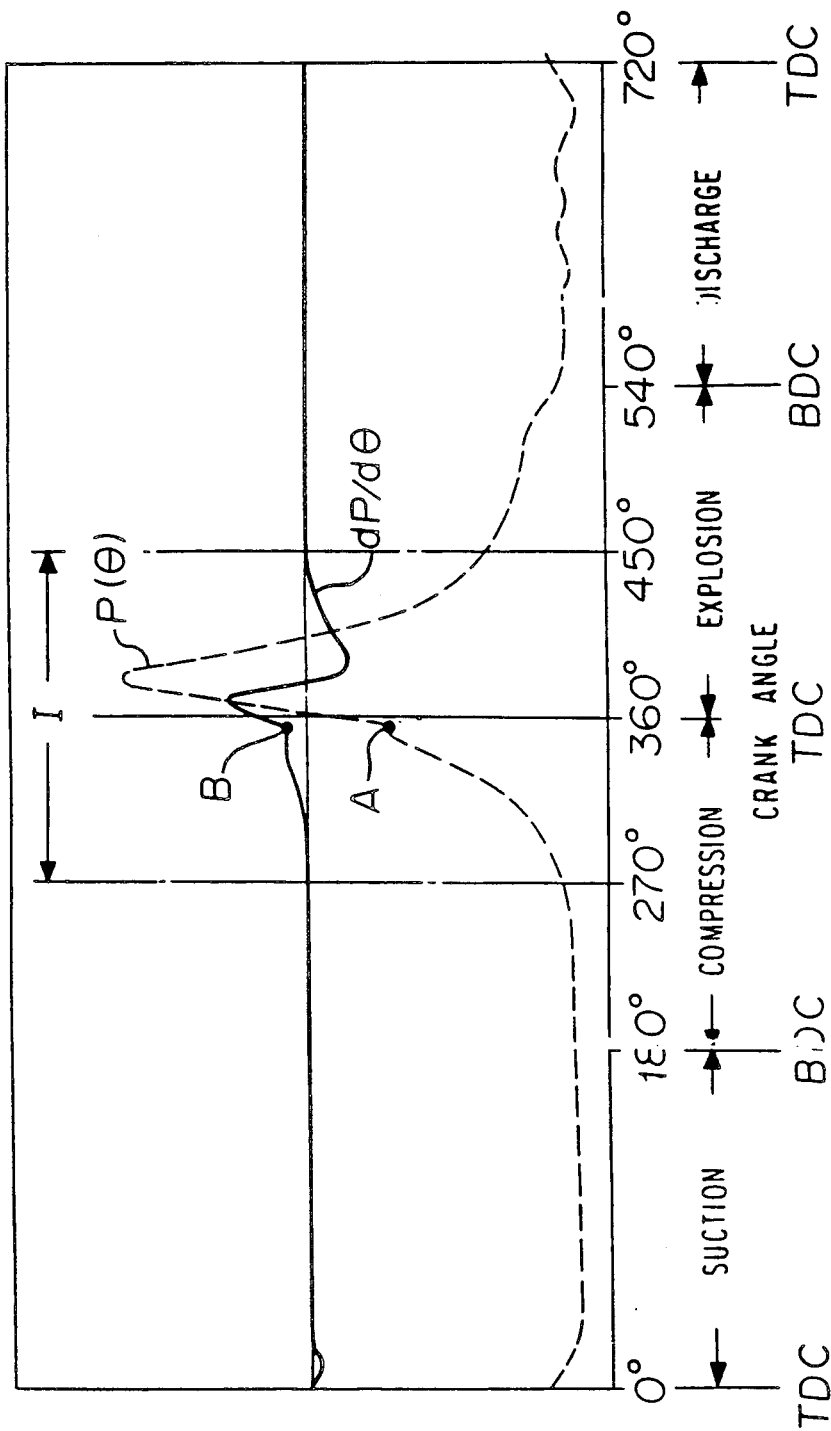

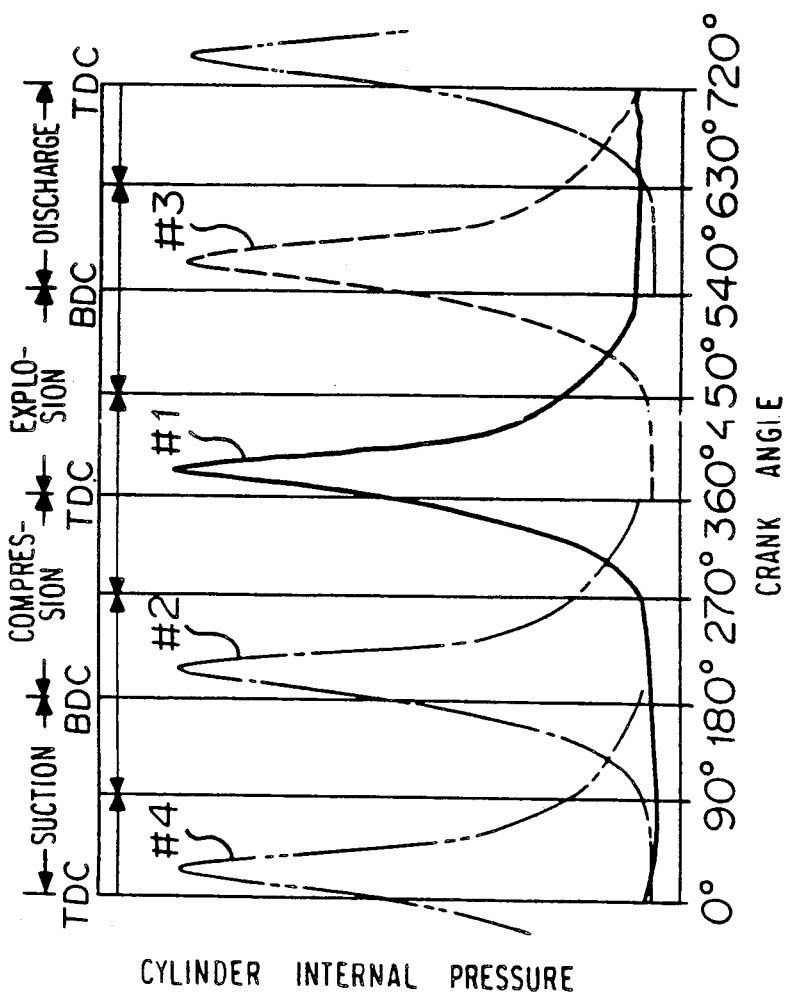
FIGURE 4a
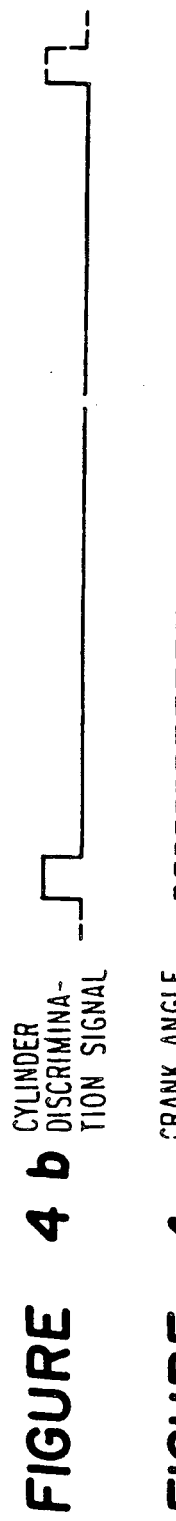
FIGURE 4b CYLINDER DISCRIMINATION SIGNAL
FIGURE 4c CRANK ANGLE SIGNAL

TROUBLE DIAGNOSIS APPARATUS FOR AN INTERNAL COMBUSTION ENGINE

BACKGROUND OF THE INVENTION

1. Field of the Invention

The present invention relates to a trouble diagnosis apparatus for an internal combustion engine which judges troubles such as a combustion trouble, an ignition trouble or the like in the internal combustion engine.

2. Discussion of Background

Heretofore, a voltage at the primary winding of the boosting coil is detected to monitor the ignition state of the engine. When there is found that the coil produces a voltage at the primary winding side, it is judged that the engine normally performs igniting operations.

However, since the conventional technique relys on estimation, it can not judge that the engine certainly performs combustion and igniting operations.

SUMMARY OF THE INVENTION

It is an object of the present invention to provide a trouble diagnosis apparatus for internal combustion engine which detects directly an ignition trouble or a combustion trouble in the engine.

The foregoing and other objects of the present invention have been attained by providing a trouble diagnosis apparatus which comprises a cylinder internal pressure change detecting means to detect a change in the inner pressure of the cylinders of an internal combustion engine, a differentiation means to effect differentiation of an output signal outputted from the cylinder internal pressure change detecting means and a judging means to judge the internal combustion engine being faulty when a quantity of change of the output signal of the differentiation means is a predetermined value or lower.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a block diagram showing a basic construction of the trouble diagnosis apparatus for an internal combustion engine according to the present invention;

FIG. 2 is a graph showing a change of cylinder inner pressure of the internal combustion engine;

FIG. 3 is a block diagram showing the entire construction of an embodiment of the trouble diagnosis apparatus of the present invention;

FIG. 4 (including parts a-c) is a graph showing a change of inner pressure of each cylinder in the engine;

DETAILED DESCRIPTION OF THE PREFERRED EMBODIMENTS

Figure 5:
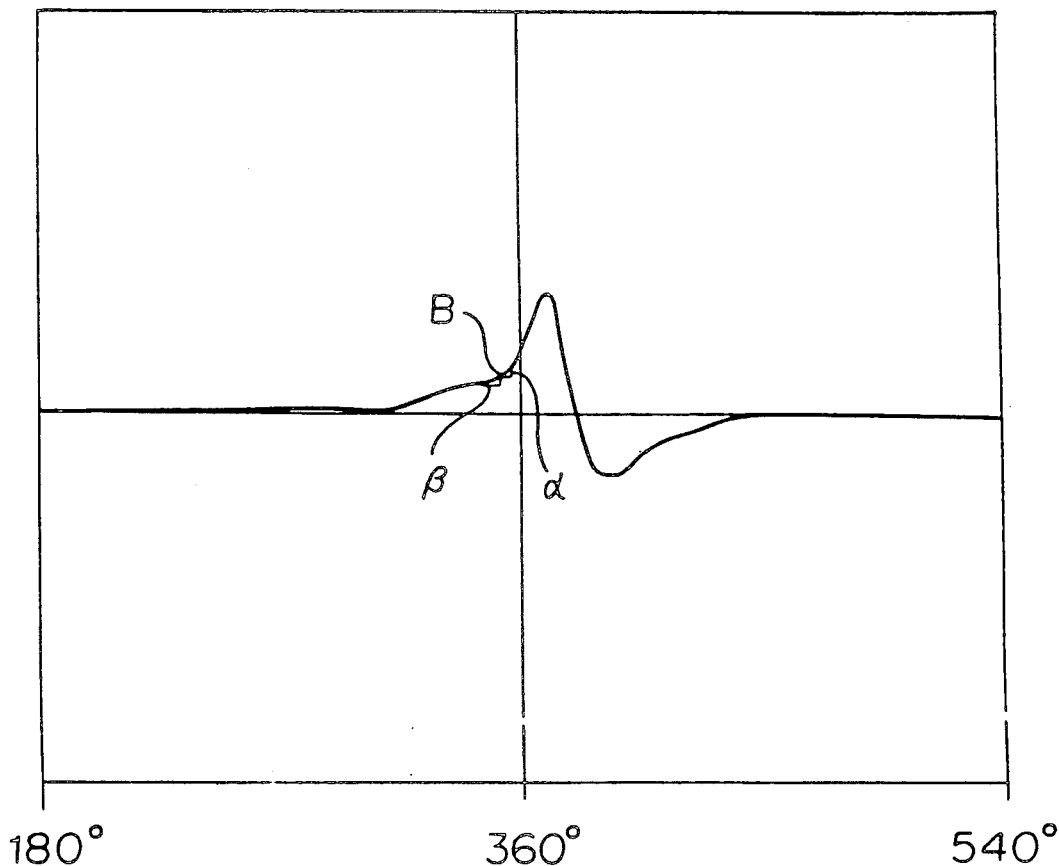
FIG. 5 is a graph showing the change of cylinder inner pressure in detail.

Referring to the drawings, wherein the same reference numerals designate the same or corresponding parts, and particularly to FIG. 1 which is a block diagram showing the structural elements of the trouble diagnosis apparatus of the present invention, reference character M1 designates an internal combustion engine, a reference character M2 designates a crank angle detecting means to detect the crank angles, which outputs pulse signals pulsating at each reference position of crank angle and each unit angle, a reference character M3 designates a pressure detecting means to detect the inner pressure of each cylinders, and a reference character M4 designates a trouble diagnosis means.

The trouble diagnosis apparatus having the above mentioned construction is so adapted that the inner pressure of the cylinders is measured at predetermined crank positions which are given by the crank angle detecting means M2, and the actual ignition time is detected for each of the cylinders in accordance with a predetermined process, whereby judgment on a fault in the ignition system is performed.

FIG. 3 shows an embodiment of the trouble diagnosis apparatus of the present invention. In FIG. 3, a reference numeral 1 designates an internal combustion engine having the first to fourth cylinders #1, #2, #3, #4 and reference numerals 6 to 9 respectively designate pressure sensors which detect the inner pressure of each of the cylinders 2 to 5. The pressure sensor may be a piezoelectric element which produces an electric charge in correspondence to a change of pressure in the cylinder or a semiconductor pressure sensor which is adapted to lead a pressure to the semiconductor diaphragm to thereby detect the pressure as a change of resistance.

A reference numeral 10 designates a crank angle sensor attached to the crank shaft of the engine 1. The crank angle sensor 10 outputs a reference position pulse signal for predetermined crank angle reference positions (for instance, every 180° and 720°) and outputs a unit angle pulse signal for each unit angle (for instance, every 1°) to thereby determine a timing for pressure detection. A numeral 30 designates a cylinder inner pressure measuring section to receive outputs of the pressure sensors 6-9 and the crank angle sensor 10 so that the inner pressure of each of the cylinders is measured. The cylinder inner pressure measuring section 30 comprises interfaces (I/F) 12, 13, 14, 15 which convert the outputs of the pressure sensors 6-9 into voltage values, a timing interface 16 to receive the output of the crank angle sensor 10, an A/D converter 27, a single chip microcomputer 26 having a memory 28 and a multiplexer 29 which selects the outputs of the interfaces 12-15, switches the outputs and transmits them to the A/D transducer in accordance with the control command of the microcomputer 26. In the trouble diagnosis apparatus having the above-mentioned construction, the outputs of the pressure sensors 6-9 are inputted to the multiplexer 29 through the interfaces 12-15, the output signals are selected in the multiplexer 29 and the selected signals are sequentially inputted to the microcomputer 26.

FIGS. 4a to 4c show a change in the inner pressure of each of the cylinders 2-5 (in this embodiment, a 4-stroke 4-cylinder engine is exemplified) with respect to the crank angles, and the signal waveforms at each part. In FIG. 4a, a solid line indicates the pressure waveform of the first cylinder #1 of the engine 1, a broken line indicates the pressure waveform of the third cylinder #3, a one-dotted chain line indicates the pressure waveform of the second cylinder #2 and a two dotted chain line indicates the pressure waveform of the fourth cylinder

4, wherein the areas BDC represent lower dead points and the areas TDC represent the upper dead points. As shown in FIG. 4a, the combustion cycle of each of the cylinders in the 4-cylinder engine has a please difference of crank angle 180°. In FIG. 4a, only the compression process and the explosion process are shown for the pressure waveforms of the cylinders #2-#4 and the suction process and the discharge process are omitted.

The crank angle sensor 10 produces a cylinder discrimination signal having intervals of 720° as shown in FIG. 4b and produces a crank angle signal having intervals of 1° as shown in FIG. 4c. These signals are inputted to the microcomputer 26 through the timing interface 16. The pressure signals selected by the multiplexer 29 are subjected to A/D converter by the A/D transducer 27 at predetermined crank angles, and the A/D converted pressure signals are stored in the memory 28.

In the next place, a method of detecting an actual ignition timing will be described in more detail.

FIG. 2 shows the cylinder inner pressure waveform $P(\theta)$ for the first cylinder #1 and the differentiation waveform $dP/d\theta$ which are obtained by the A/D conversion of the outputs of the pressure sensors 6-9 at each of the crank angle signals. In FIG. 2, a dotted line represents the cylinder inner pressure waveform $P(\theta)$ of the first cylinder #1 and a solid line represents the differentiation waveform $dP/d\theta$ (hereinafter, referred to as $dP/d\theta$) of the first cylinder #1. The value of $dP/d\theta$ can be obtained with the following formula:

$$dP/d\theta = P_{AD(n)} - P_{AD(n-1)} \qquad (b)$$

The formula (1) is to obtain the difference between a pressure value $P_{AD(n)}$ obtained at each predetermined crank angle and the pressure value $P_{AD(n-1)}$ obtained at the crank angle just before the predetermined crank angle, both pressure values being obtainable by A/D conversion. Since the gradient of the waveform in the compression process and the explosion process varies depending on the operational condition of the engine, the absolute value of $dP/d\theta$ varies. Ignition of a compressed gas mixture at a point A of $P(\theta)$ causes a rapid increase in the gradient $P(\theta)$. As a result, it is possible to know the actual ignition time by obtaining the point B of $dP/d\theta$.

As described before, since the absolute value of $dP/d\theta$ varies depending on the operational condition of the engine, the following measures are taken to detect the point B in FIG. 2. Namely, the value $\alpha$ of $dP/d\theta_{(n)}$ for each predetermined crank angle (for instance, every 1°) and the value $\beta$ of $dP/d\theta_{(n-1)}$ at the crank angle just before the predetermined crank angle are respectively obtained, and the value $\gamma$ of $\Delta dP/d\theta$, which is the difference between the values $\alpha$ and $\beta$, is obtained by $\gamma = \alpha - \beta$ as shown in FIG. 5. The actual ignition time can be detected by detecting a point where the value $\gamma$ becomes a predetermined value or higher, namely, the point B where the gradient of $P(\theta)$ rapidly increases by ignition, hence, gradient of $dP/d\theta$ rapidly increases.

Thus, the actual ignition time is detected, and the actual ignition time is compared with the ignition time which is previously determined by an engine control unit, whereby trouble diagnosis on the ignition system is performed.

The timing of measuring the actual ignition time will be explained. The time point at which the compressed gas mixture is fired is always included in a range of 180° (which is indicated by a symbol I in FIG. 2) from the point of 270° in the compression process to the point of 450° in the explosion process. Accordingly, the A/D conversion of the cylinder inner pressure is executed every crank angle signal within the range of 180°. The upper dead point of the first cylinder in the suction process is detected by the cylinder discrimination signal as shown in FIG. 4b, and the crank angle is detected by the crank angle signal as in FIG. 4c. A crank angle counter CCA which starts count-up on receiving the crank angle signal is reset by the cylinder discrimination signal as in FIG. 4b, and then, counting-up is carried out by the crank angle signal. In the range as indicated by the symbol I in FIG. 2, the cylinders are discriminated by the values counted by the counter CCA, and the ignition to the cylinders sequentially is detected.

Figure 6:
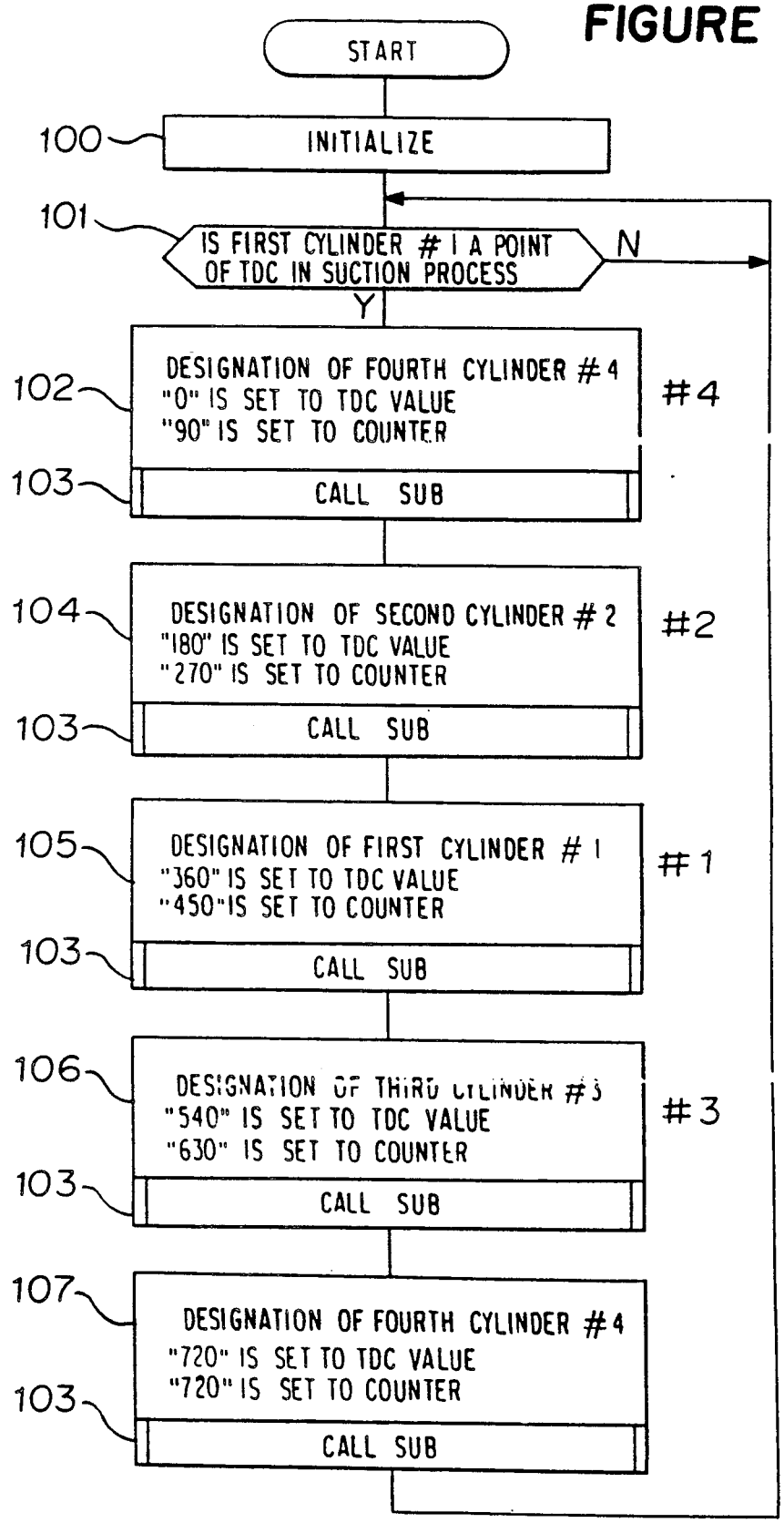
FIG. 6 is a flow chart showing the main routine for detecting an engine trouble.
Figure 7:
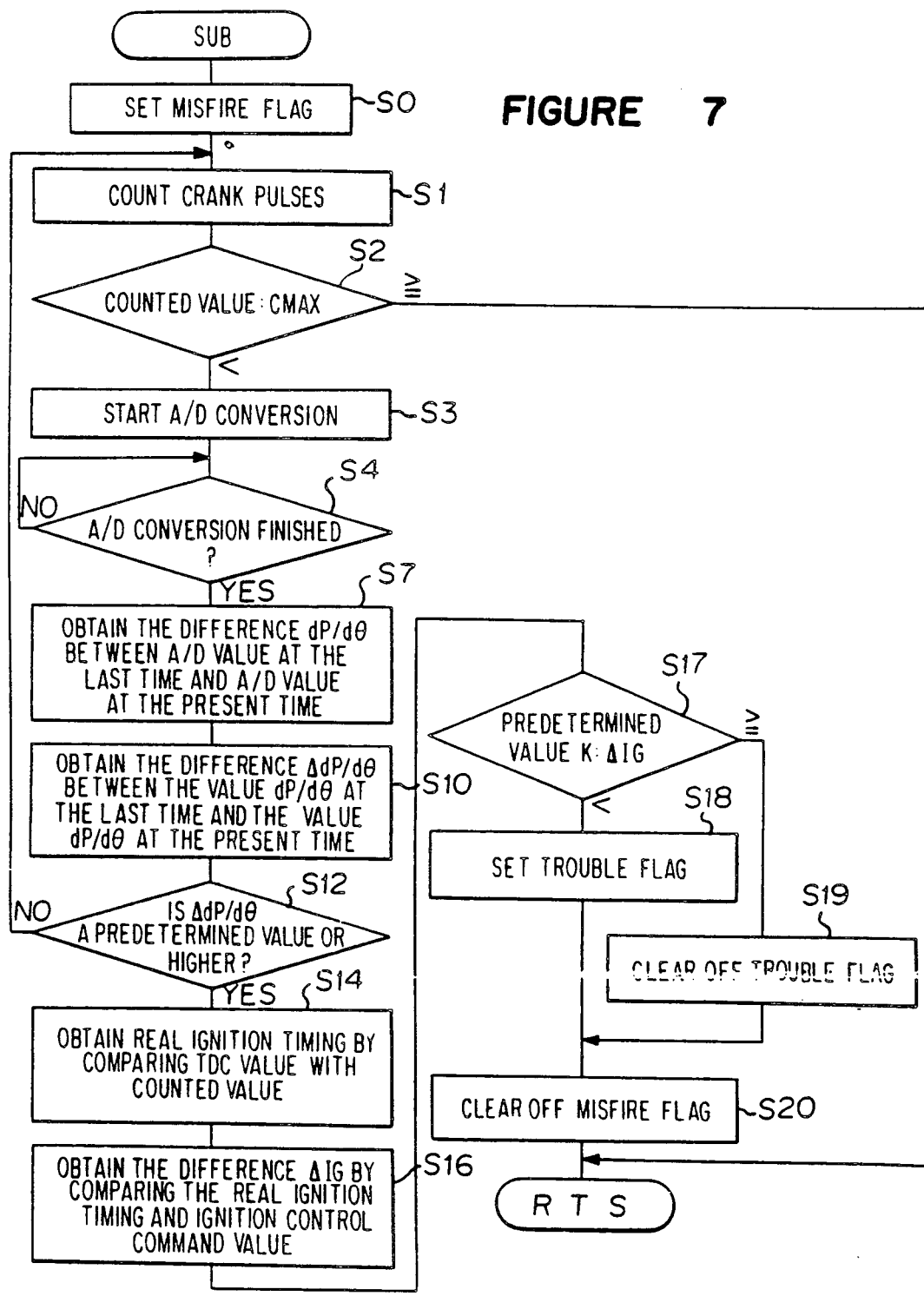
FIG. 7 is a flow chart showing a sub routine in FIG. 6.

FIG. 6 and 7 are flow charts for detecting the ignition time of each of the cylinders.

FIG. 6 shows the main routine for detecting the ignition time. At Step 100, to start the detection of the ignition time, the memory for storing the data of the ignition time is reset, and the counter to count crank angles is cleared off.

At Step 101, determination is made as to whether or not the cylinder discrimination signal (FIG. 4b) of the crank angle sensor 10 appears. When the cylinder discrimination signal is detected, the process of Step 102 is effected. Namely, the microcomputer 26 receives the signal of the fourth cylinder #4 by means of the multiplexer 29 so that the signal is subjected to A/D conversion by the A/D converter, and sets a value 90 to the maximum comparison value CMAX of a crank angle measuring counter at Step 102.

At Step 103, a sub-routine is called from the main routine as in FIG. 6 in order to execute it. The detail of the sub routine is shown in FIG. 7.

The angle signal of the crank angle sensor 10 is supplied, as an interruption signal in the treatment of the program, to the microcomputer 26 through the interface 16, the angle signal being used at Step 101.

At Step S0 in FIG. 7, a misfire flag to regard as misfiring is set when the actual ignition point B can not be detected.

At Step S1, the value of the counter CCA is increased at each rising portion of the crank angle pulses as shown in FIG. 4c.

At Step S2, the maximum comparison value CMAX in the counter which has been provided in the main routine as in FIG. 6 is compared with the value of the counter CCA obtained at Step S1. When these values are not in agreement with each other, the operation of A/D conversion is started at Step S3 to thereby measure the pressure. On the other hand, when the values are in agreement with each other, the operation is returned to the main routine as shown in FIG. 6.

At Step S4, judgment is made as to whether or not the operation of A/D conversion has been finished. It is found that the operation has been finished, the operation is moved to Step S7. At Step S7, the A/D-converted pressure value $P_{AD(n)}$ at the present time and the A/D-converted pressure value $P_{AD(n-1)}$ at the last time are respectively read from the memory 28, and the value $dP/d\theta$, i.e. the pressure deference $\alpha$ is obtained by the calculation of these values, and the value $P_{AD(n)}$ is set to the value $P_{AD(n-1)}$. At Step S10, the pressure difference $\alpha$ and the value $dP/d\theta$, i.e. the value $\beta$ obtained at the last time are read from the memory 28 to calculate $\Delta dP/d\theta$, and $\alpha$ is set to $\beta$.

At Step S12, the value $\Delta dP/d\theta$ is compared with a predetermined value representing a dead zone or a non-sensitive zone which is previously provided. As a result of the comparison, when the value $\Delta dP/d\theta$ is smaller than the predetermined value, i.e. the non-sensitive zone value, the sequential step is returned to Step S1. Otherwise, the sequential step moved to Step S14.

At Step S14, the TDC value in the explosion process which is obtained in the main routine is read, and difference between the value of the counter CCA and the TDC value, i.e. the actual ignition time (RIG) represents the point B as shown in FIG. 5 is calculated. For the actual ignition time which is obtained at Step S14, a positive value means a time point before the TDC which is represented by BTDC, and a negative value means a time point after the TDC which is represented by ATCD.

At Step S16, an ignition time command value IG which is to be controlled by the control unit is read, and the ignition time command value IG is compared with the actual ignition time RIG to obtain a difference value $\Delta IG$.

At Step S17, the value $\Delta IG$ is compared with a coefficient K which is a dead zone quantity, i.e. a non-sensitive quantity determined in consideration of a delay in the operation of the pressure detecting means. When the value $\Delta IG$ is greater than the coefficient K, the judgment that a trouble takes place in the ignition system is made, and a trouble flag is set at Step S18. When a negative judgment is made, the trouble flag is cleared off at Step S19. Then, the misfire flag is cleared off at Step S20.

In FIG. 7, the cylinder inner pressure change detecting means which detects a change in cylinder inner pressure in the internal combustion engine corresponds to Steps S3 and S4. The differentiation means which effects the differentiation of the output signal outputted from the cylinder inner pressure change detecting means corresponds to Steps S7 and S10. The judging means which judges that the internal combustion engine becomes faulty when a change quantity in the output signal of the differentiation means is lower than a predetermined value corresponds to Steps S14, S16 and S17.

After the trouble diagnosis has been carried out in a manner as described above, sequential step is returned to Step 104 in the main routine as shown in FIG. 6. At Step 104, the A/D converter is connected to the line to the second cylinder #2, and the maximum comparison value of the crank angle pulse for pressure measurement is set to 270 in conformity with the second cylinder. Then, Step 103 which constitutes the before-mentioned subroutine is called and the sequential steps as in FIG. 7 are executed, whereby the trouble diagnosis on the second cylinder #2 is carried out.

In the same manner as above, the first cylinder #1 is designated at Step 105, the third cylinder #3 is designated at Step 106, and the fourth cylinder #4 is again designated at Step 107. For each of the Steps 105, 106 and 107, the trouble diagnosis is executed at Step 103 respectively.

Thus, the presence or absence of the trouble of the cylinders #4, #2, #1 and #3 is judged in accordance with the order of the ignition. After that judgment, the sequential step is returned to Step 101 so as to repeat the trouble diagnosis.

In the above-mentioned embodiment, the inner pressures of the plural cylinders are intermittently and sequentially measured by using a single A/D converter through the multiplexer so as to detect misfiring in the cylinders. However, each of the cylinders may be provided with an A/D converter for exclusive use. In this case, misfiring in plural cylinders can be simultaneously detected.

In accordance with the present invention, the trouble diagnosis of the ignition system can be performed by detecting the inner pressure of the cylinders by the pressure detecting means; by obtaining the actual ignition time from the output value of the pressure detecting means and by comparing the actual ignition time value with the ignition command value provided by the control unit. In accordance with the trouble diagnosis of the present invention, the misfiring in the cylinders and deviation in the ignition timing due to the deterioration the ignition elements such as an ignition plug, a high tension cord, a power transistor or the like can be directly detected depending on the combustion state of the engine.

Obviously, numerous modifications and variations of the present invention are possible in light of the above teachings. It is therefore to be understood that within the scope of the appended claims, the invention may be practiced otherwise than as specifically described herein.

What is claimed is:

1. A trouble diagnosis apparatus which comprises:
   a cylinder internal pressure change detecting means to detect a change in the inner pressure of the cylinders of an internal combustion engine,
   a differentiation means to effect differentiation of an output signal outputted from the cylinder internal pressure change detecting means and
   a judging means to judge the internal combustion engine being faulty when a change quantity of output signal of the differentiation means is a predetermined value or lower.

2. The trouble diagnosis apparatus according to claim 1, wherein the differentiation means is to obtain the value $dP/d\theta$ between a pressure value at each predetermined crank angle and a pressure value at the crank angle just before the predetermined crank angle, both the values being A/D converted, and to obtain the value $\Delta dP/d\theta$ between the value $dP/d\theta$ at the predetermined crank angle and the value $dP/d\theta$ at the crank angle just before the predetermined crank angle.

3. The trouble diagnosis apparatus according to claim 2, wherein when the value $\Delta dP/d\theta$ is at least a predetermined value, a TDC value for a specified cylinder is compared with the value counted in a counter to calculate actual ignition timing RIG, and the value of actual ignition timing RIG is compared with an ignition timing command value IG to obtain a difference value $\Delta IG$, whereby a judgment of trouble is provided.

* * * * *